US011338462B2

(12) United States Patent
Einloft-Velte et al.

(10) Patent No.: US 11,338,462 B2
(45) Date of Patent: May 24, 2022

(54) PROVIDING A CUTTING AREA WITH WEB-LIKE INTERLEAVER MATERIAL

(71) Applicant: Weber Maschinenbau GmbH Breidenbach, Breidenbach (DE)

(72) Inventors: Tobias Einloft-Velte, Dautphetal (DE); Thomas Nispel, Dautphetal (DE); Noël Ritzen, Siegen (DE)

(73) Assignee: Weber Maschinenbau GmbH Breidenbach (*) Notice: Subject to any disclaimer, the term of this patent is extended or adjusted under 35 U.S.C. 154(b) by 125 days.

(21) Appl. No.: 16/881,829

(22) Filed: May 22, 2020

(65) Prior Publication Data
US 2020/0282584 A1 Sep. 10, 2020

Related U.S. Application Data

(63) Continuation of application No. 16/025,644, filed on Jul. 2, 2018, now Pat. No. 10,703,001.

(30) Foreign Application Priority Data

Jul. 3, 2017 (DE) .......................... 102017114763.2
Aug. 18, 2017 (DE) .......................... 102017118927.0

(51) Int. Cl.
B26D 1/56 (2006.01)
B26D 7/32 (2006.01)
(Continued)

(52) U.S. Cl.
CPC ............. B26D 1/565 (2013.01); B23D 33/04 (2013.01); B26D 7/32 (2013.01); B26D 7/325 (2013.01);
(Continued)

(58) Field of Classification Search
CPC ...... B26D 1/565; B26D 7/32; B26D 2210/02; B23D 33/04; B65H 39/16;
(Continued)

(56) References Cited

U.S. PATENT DOCUMENTS 3,586,006 A * 6/1971 Wendt ....................... A24C 5/20
131/280
3,675,387 A * 7/1972 Lekan ...................... B65B 25/08
53/157
(Continued)

FOREIGN PATENT DOCUMENTS

DE 19806561 8/1999
DE 10227365 A1 1/2004
(Continued)

OTHER PUBLICATIONS https://www.provisioneronline.com/articles/107956-how-optimal-interleaving-materials-can-boost-the-bottom-line (Year: 2019).*
(Continued)

Primary Examiner — Sean M Michalski
(74) Attorney, Agent, or Firm — Dickinson Wright PLLC

(57) ABSTRACT

An apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, comprising an output device which is configured to eject at least one material web into the cutting region, wherein the output device comprises at least one driven feed roll and at least one counter-unit which forms a feed gap for the material web together with the feed roll.

19 Claims, 6 Drawing Sheets

(51) Int. Cl.
*B65H 20/02* (2006.01)
*B65H 16/02* (2006.01)
*B65H 16/10* (2006.01)
*B23D 33/04* (2006.01)
*B65H 39/16* (2006.01)
*B65H 20/32* (2006.01)

(52) U.S. Cl.
CPC ......... *B65H 16/021* (2013.01); *B65H 16/028* (2013.01); *B65H 16/106* (2013.01); *B65H 20/02* (2013.01); *B65H 20/32* (2013.01); *B65H 39/16* (2013.01); *B26D 2210/02* (2013.01); *B65H 2301/41398* (2013.01); *B65H 2301/412845* (2013.01); *B65H 2301/46* (2013.01); *B65H 2403/7253* (2013.01); *B65H 2406/351* (2013.01); *B65H 2408/214* (2013.01); *B65H 2408/215* (2013.01); *B65H 2408/217* (2013.01)

(58) Field of Classification Search
CPC ........... B65H 2403/7253; B65H 2301/412845; B65H 2408/217; B65H 20/32; B65H 2408/215
See application file for complete search history.

(56) References Cited

U.S. PATENT DOCUMENTS

| | | | | |
|---|---|---|---|---|
| 3,741,079 A * | 6/1973 | Bossons | B31F 5/027 | 493/350 |
| 3,772,040 A * | 11/1973 | Benson | B65B 25/08 | 426/420 |
| 3,787,001 A * | 1/1974 | Henry | B65H 23/085 | 242/417.2 |
| 3,848,757 A * | 11/1974 | Jordan | B65B 35/50 | 414/802 |
| 3,861,612 A * | 1/1975 | Kubo | B65H 19/1815 | 242/555.6 |
| 4,116,399 A * | 9/1978 | Mosburger | B65H 19/1852 | 242/552 |
| 4,176,000 A * | 11/1979 | Achelpohl | B29C 66/81427 | 156/510 |
| 4,247,094 A * | 1/1981 | Vits | B65H 29/241 | 271/183 |
| 4,583,435 A | 4/1986 | Fessler | | |
| 4,830,355 A * | 5/1989 | Jeschke | B65H 29/683 | 271/183 |
| 4,944,467 A * | 7/1990 | Snygg | B65H 23/06 | 242/422.9 |
| 5,088,713 A * | 2/1992 | Hayashi | G03G 15/234 | 271/108 |
| 5,117,717 A * | 6/1992 | Mally | B26D 5/20 | 53/157 |
| 5,137,225 A * | 8/1992 | Biagiotti | B65H 19/30 | 242/521 |
| 5,478,066 A * | 12/1995 | Yoshida | B65H 3/128 | 271/12 |
| 5,979,308 A * | 11/1999 | Kagi | B41F 19/068 | 101/27 |
| 5,992,844 A * | 11/1999 | Dillinger | B65H 29/6618 | 271/182 |
| 6,101,351 A * | 8/2000 | Suda | G03G 21/1638 | 399/114 |
| 6,142,425 A * | 11/2000 | Armanios | B64C 9/38 | 244/207 |
| 6,145,833 A * | 11/2000 | Rodewald | B65H 29/20 | 271/182 |
| 6,613,253 B1 * | 9/2003 | Negishi | B26D 1/0006 | 264/345 |
| 6,752,056 B1 | 6/2004 | Weber | | |
| 7,189,308 B2 * | 3/2007 | Feit | D21H 27/10 | 162/135 |
| 7,424,903 B2 * | 9/2008 | Kagi | B41F 19/068 | 156/459 |
| 7,601,375 B2 * | 10/2009 | Langton | H04N 1/2137 | 426/124 |
| 8,079,587 B2 * | 12/2011 | Holzschneider | B65H 29/02 | 271/183 |
| 9,044,872 B2 * | 6/2015 | Pryor | B65B 25/08 | |
| 9,334,135 B2 * | 5/2016 | Grill | B65H 29/6618 | |
| 9,878,462 B2 * | 1/2018 | Horberg | B26D 7/325 | |
| 2002/0179767 A1 * | 12/2002 | Rapparini | B65H 20/32 | 242/417.1 |
| 2007/0107739 A1 | 5/2007 | Sato et al. | | |
| 2008/0169601 A1 * | 7/2008 | Frank | B65H 29/02 | 271/183 |
| 2008/0250944 A1 * | 10/2008 | Pryor | B65B 25/08 | 99/537 |
| 2008/0308102 A1 * | 12/2008 | Davies | A61M 15/0043 | 128/203.15 |
| 2009/0230618 A1 * | 9/2009 | Holzschneider | B65H 29/686 | 271/270 |
| 2009/0297204 A1 * | 12/2009 | Kaji | G03G 21/206 | 399/92 |
| 2010/0112916 A1 * | 5/2010 | Epstein | B65B 57/04 | 451/396 |
| 2012/0073249 A1 * | 3/2012 | Pryor | B65B 41/12 | 53/514 |
| 2012/0133092 A1 * | 5/2012 | Fuda | B65H 3/14 | 271/104 |
| 2012/0148290 A1 * | 6/2012 | Asami | G03G 15/2042 | 399/92 |
| 2012/0161384 A1 * | 6/2012 | Suzuki | B65H 3/48 | 271/11 |
| 2012/0299236 A1 * | 11/2012 | Fujita | B65H 3/48 | 271/96 |
| 2013/0087290 A1 * | 4/2013 | Ohsawa | B41F 16/0033 | 156/361 |
| 2014/0086646 A1 * | 3/2014 | Okuno | G03G 15/2028 | 399/323 |
| 2014/0145395 A1 * | 5/2014 | Takano | G03G 15/6552 | 271/211 |
| 2016/0272440 A1 * | 9/2016 | Mayer | B65G 47/68 | |
| 2016/0286852 A1 * | 10/2016 | Gindrat | B65H 19/20 | |
| 2016/0316770 A1 * | 11/2016 | van Blokland | A21C 14/00 | |
| 2016/0346951 A1 * | 12/2016 | Horberg | B33Y 80/00 | |
| 2017/0165712 A1 * | 6/2017 | Fischer | B65H 20/32 | |
| 2017/0165858 A1 * | 6/2017 | Bochtler | B26D 7/0683 | |
| 2017/0205601 A1 | 7/2017 | Kim | | |
| 2017/0259448 A1 * | 9/2017 | Weber | B26D 7/0625 | |
| 2017/0266831 A1 * | 9/2017 | Wachter | B26D 7/0625 | |
| 2017/0368707 A1 * | 12/2017 | Keller | B26D 7/0633 | |
| 2018/0111283 A1 * | 4/2018 | Klockow | B26D 7/2614 | |
| 2018/0169888 A1 * | 6/2018 | Weber | B26D 7/0616 | |
| 2019/0009476 A1 * | 1/2019 | Sperry | B29C 66/1122 | |
| 2019/0022885 A1 * | 1/2019 | Einloft-Velte | B65H 20/32 | |
| 2019/0022886 A1 * | 1/2019 | Einloft-Velte | B65H 20/32 | |
| 2019/0023518 A1 * | 1/2019 | Gerhardt | B65H 20/32 | |
| 2019/0030743 A1 * | 1/2019 | Einloft-Velte | B26D 7/27 | |
| 2019/0047168 A1 * | 2/2019 | Bialy | B65B 25/06 | |
| 2019/0152084 A1 * | 5/2019 | Schmeiser | B26D 5/007 | |
| 2019/0152085 A1 * | 5/2019 | Reisz | B65H 16/106 | |
| 2019/0232512 A1 * | 8/2019 | Votava | B26D 1/225 | |
| 2019/0232513 A1 * | 8/2019 | Erne | B26D 7/32 | |
| 2021/0197598 A1 * | 7/2021 | Washio | G03G 15/6502 | |
| 2021/0294264 A1 * | 9/2021 | Yamada | G03G 15/657 | |

FOREIGN PATENT DOCUMENTS

| | | |
|---|---|---|
| DE | 102007012370 A1 | 9/2008 |
| DE | 102011013245 A1 | 9/2012 |
| DE | 102011102432 A1 | 11/2012 |
| DE | 102012004082 A1 | 8/2013 |
| DE | 102012009648 A1 | 11/2013 |
| DE | 102013204956 A1 | 9/2014 |
| DE | 102013006322 A1 | 10/2014 |
| EP | 0251337 A2 | 1/1988 |
| EP | 1705429 A2 | 9/2006 |

(56) References Cited

FOREIGN PATENT DOCUMENTS

| | | |
|---|---|---|
| EP | 2848380 | 3/2015 |
| EP | 2942166 A1 | 11/2015 |
| WO | 2012024673 A2 | 2/2012 |

OTHER PUBLICATIONS

International Search Report and Written Opinion dated Jan. 3, 2019 from International Patent Application No. PCT/EP2018/075784, 13 pages.
German Search Report from the German Patent Office for related German Application No. 102017122754.7 dated Jul. 7, 2018, 8 pages.
European Search Report dated Sep. 2, 2021 for European Application No. 21154164.4, 6 pages.
European Patent Office Notification of an Objection dated Jan. 25, 2022 for European Application No. 18181286.8, 6 pages.

\* cited by examiner

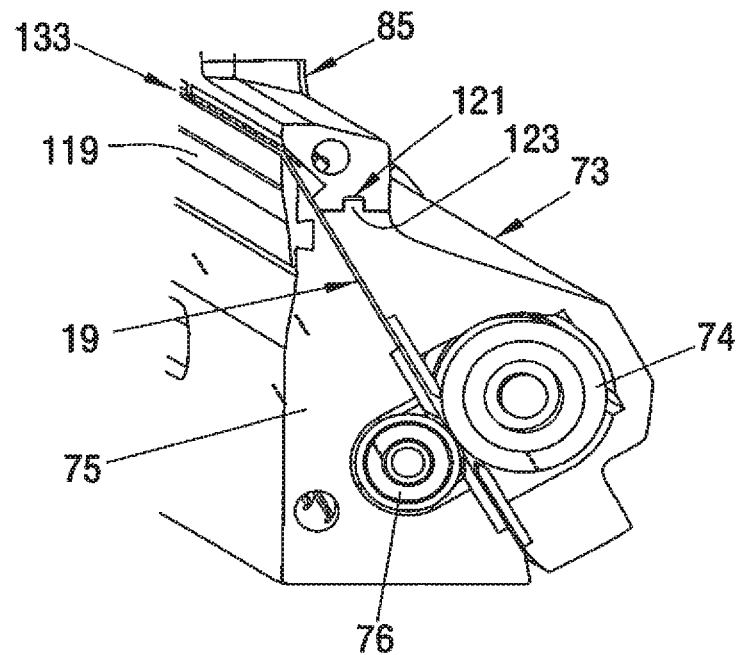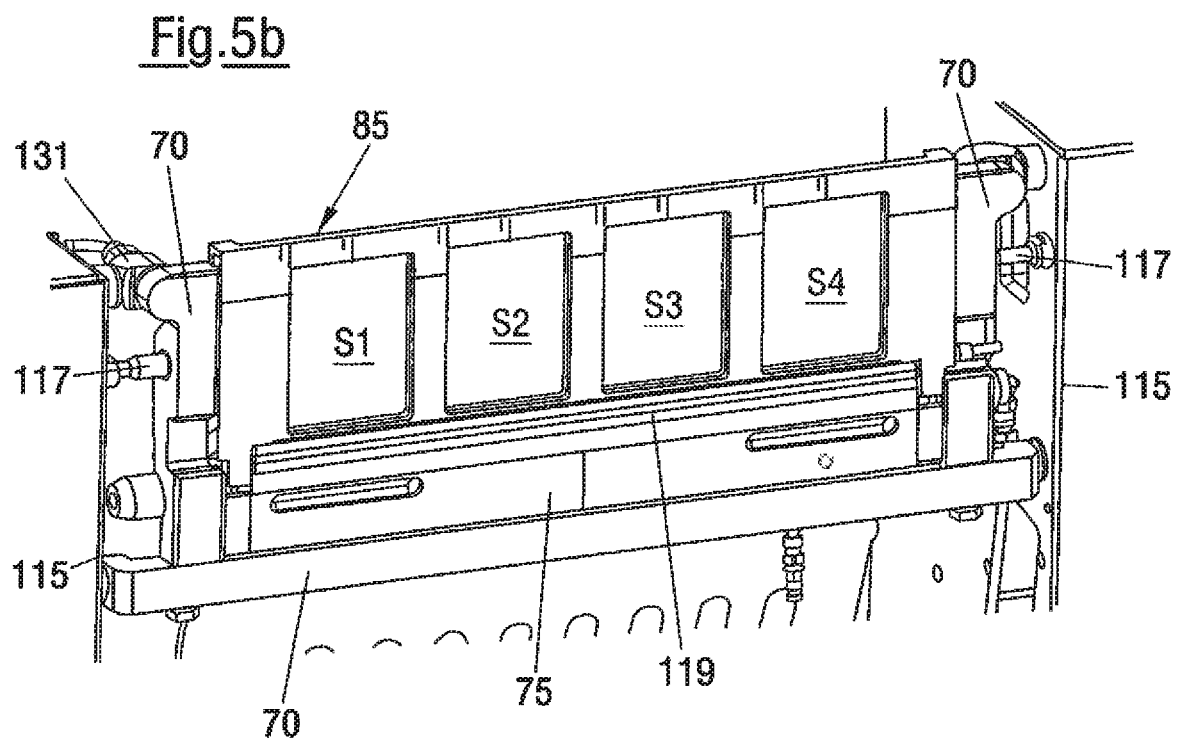

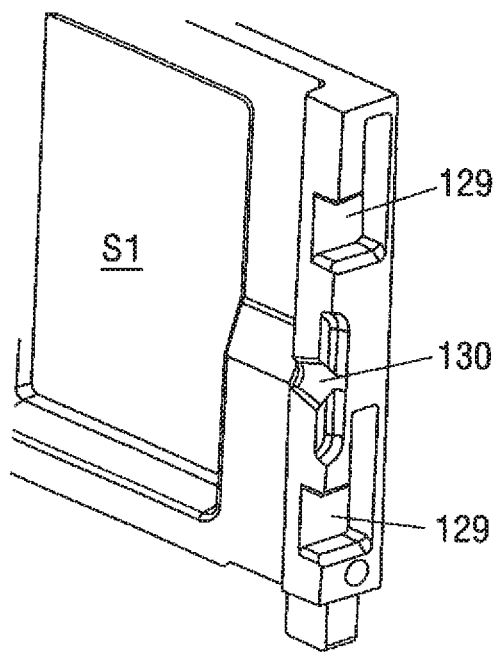
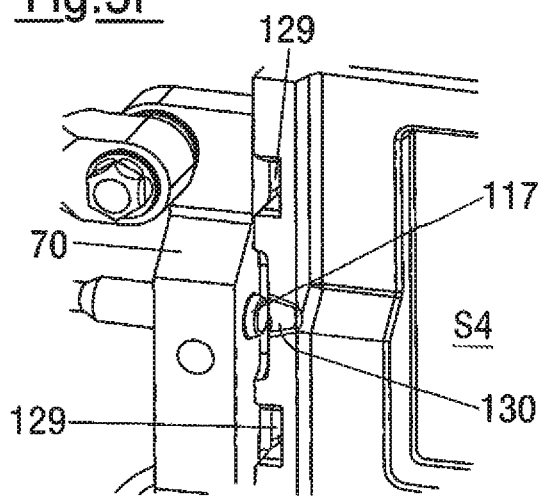
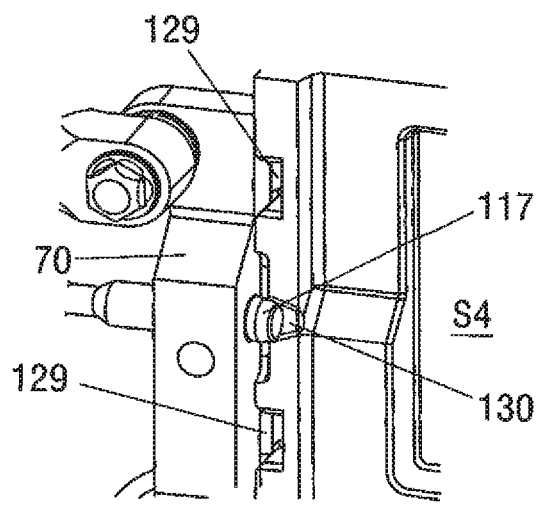
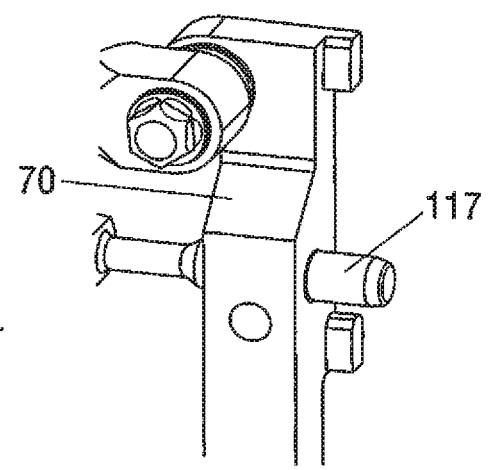

PROVIDING A CUTTING AREA WITH WEB-LIKE INTERLEAVER MATERIAL

CROSS REFERENCE TO RELATED APPLICATION

This application is a continuation of U.S. patent application Ser. No. 16/025,644, filed Jul. 2, 2018, which claims priority to German Application No. DE 102017118927.0 filed Aug. 18, 2017, and German Application No. DE 102017114763.2 filed Jul. 3, 2017, the disclosure of each is incorporated by reference in its entirety.

SUMMARY OF THE DISCLOSURE

The disclosure relates to an apparatus for a single-track or multitrack provision of web-like interleaved sheet material at a cutting region in which supplied products are cut into slices and interleaved sheets are introduced which are cut off from the provided interleaved sheet material in the cutting region.

In the cutting region, slices cut off from the products can consequently be provided with the interleaved sheets introduced into the cutting region. In this respect, either interleaved sheets can e.g. be introduced between a respective two directly consecutive slices or interleaved sheets can be introduced beneath a respective slice and thus between this slice and a support surface of this slice. A respective interleaved sheet is then, for example, located beneath the lowest slice of a portion on the formation of portions from a plurality of slices. Such a function which is also called an underleaver function, however, does not preclude that, on the formation of portions, a respective interleaved sheet is not only disposed beneath the lowest slice, but one or more interleaved sheets are also introduced between a respective two consecutive slices within the portion. Independently of whether an underleaver function is provided or not, a respective interleaved sheet can generally be introduced within a portion either between each pair of directly consecutive slices or only between one or more pairs of directly consecutive slices, e.g. between every nth pair, where n>1.

Such apparatus are generally known in the field of the slicing of food products and are also called interleavers or underleavers. An interleaver can in this respect—as mentioned above—also perform an underleaver function and vice versa. The present disclosure therefore not only applies to the interleavers primarily explained here or to the provision of interleaved sheets or interleaved sheet material between a respective two directly consecutive slices, but also to so-called underleavers which serve to place a sheet beneath products. It is ensured by such an underleaved sheet feed that at least the total lower side of the products does not directly lie on a support surface, for example, on a conveying device. When only the term "interleaver" is used in each case in the following, the respective statements and the respective disclosure—where sensible—will also apply to an "underleaver". As already mentioned, one and the same apparatus for the provision of interleaved sheet material or of interleaved sheets can perform both an interleaver function and an underleaver function in dependence on the respective application, i.e. an interleaver is simultaneously also an underleaver, and vice versa, within the framework of this disclosure.

The disclosure also relates to an apparatus for slicing food products, having a product feed which supplies products to be sliced to a cutting region in which a cutting blade moves in a rotating and/or revolving manner to cut the supplied products into slices; and having an interleaver or underleaver in accordance with the disclosure.

Such cutting apparatus are also called slicers or high-speed slicers, the latter against the background that bar-like or loaf-like food products can e.g. be sliced by such machines at high cutting speeds of several hundred to some thousand slices per minute. In many applications, stacked or overlapping portions are, for example, formed from the cut-off slices falling onto a support surface e.g. formed by a portioning belt. An interleaver, for example, serves to introduce interleaved sheets between directly consecutive slices of a portion so that the slices can later be separated from one another more easily. Paper or a plastic film, for example, serves as the material for the interleaved sheets.

In accordance with the progress in the development of cutting machines, in particular with respect to speed, accuracy and variety, ever higher demands are also made on the interleavers or underleavers. Known interleaver or underleaver concepts which generally provide satisfactory results frequently no longer meet these increased demands.

There is consequently a need for an improved interleaver or underleaver technology in particular in the field of the slicing of food products by means of high-speed slicers. In particular the operation of interleavers and underleavers on multiple tracks and individually per track is more and more in the foreground.

The high cutting speeds in particular in modem food slicers require a correspondingly high performance capability of the interleavers or underleavers on the ejection of the material web into the cutting region. This represents a special challenge above all when the cutting process takes place on multiple tracks and is controllable individually per track since these performance features also have to be present in the interleaver in order to be able to provide an operation that takes place completely individually per track.

It is the object of the disclosure to improve an apparatus for the provision of web-like interleaved sheet material to the extent that the interleaved sheet material is also reliably possible at high cutting speeds and in particular in the case of a multitrack cutting operation controllable individually per track.

This object is satisfied by the features of claim 1.

In accordance with the disclosure, the apparatus comprises an output device which is configured to eject at least one material web into the cutting region, wherein the output device comprises at least one driven feed roll and at least one counter-unit which forms a feed gap for the material web together with the feed roll.

In accordance with an embodiment, the feed roll is integrated into a feed unit of the output device and is coupled via a drive belt to a drive motor for the feed roll arranged outside the feed unit, with the drive belt being able to be tensioned and released by moving the feed unit.

The assembly and dismantling are considerably simplified by such a movable feed unit.

The feed unit can be releasably fastenable. The feed unit can in particular be removable and re-insertable. Provision is preferably made that the counter-unit can be mounted without the feed unit during assembly, whereupon the feed unit can be coupled to the counter-unit, wherein, in reverse order, the feed unit can first be removed from the counter-unit and the counter-unit can then be removed for dismantling.

The feed unit can in particular be pivotable. The feed unit can, for example, be pivotably couplable to the counter-unit in this respect.

The output device can be configured to eject material webs on multiple tracks and can comprise a driven feed roll for each track.

Provision is in particular made that the output device is controllable by an internal or external control device by an operation of the individual feed rolls individually per track.

A drive concept which is comparatively simple in a construction regard results when, in accordance with a further embodiment, the feed rolls of the individual tracks are combined pair-wise or group-wise and a coaxial shaft drive is provided for each pair or for each group and comprises a plurality of drive shafts which are disposed coaxially in one another and which are associated with a respective one of the feed rolls.

A belt drive comprising a drive motor arranged offset from a drive shaft can be provided for each drive shaft. In such a drive concept, the available construction space which is usually limited in practice can be ideally utilized.

Two pairs or groups of feed rolls can be provided which can be driven from oppositely disposed sides.

In particular if sufficient construction space is available, the drive shafts, preferably each in the form of a hollow shaft, can alternatively be laterally guided in the axial extension of the feed rolls by a housing of the feed unit by means of a clutch preferably configured as a dual clutch.

The assembly and dismantling of the output device can be further simplified if, in accordance with a further embodiment, the output device comprises a stationary mount at which at least the counter-unit and a feed unit can be mounted in a single predefined order, in particular without tools.

A cutting edge can preferably additionally be mounted at the mount, in particular without tools, with the counter-unit, the feed unit and the cutting edge being able to be mounted at the mount in a single predefined order.

The feed unit and the counter-unit, on the one hand, and the cutting edge, on the other hand, that is the three components counter-unit, feed unit and cutting edge, hereby together form a compact assembly which can be mounted and dismantled together.

A clamping device for the final positioning and/or securing at the mount can be provided for at least one of the components counter-unit and feed unit, preferably additionally for the cutting edge. This clamping device is in particular provided for the component to be mounted last. The component to be mounted last is preferably the cutting edge, and indeed inter alia because the cutting edge directly cooperates with the cutting blade.

The presence, the correct final positioning and/or the correct type of at least one of the components counter-unit and feed unit, preferably additionally of the cutting edge, can be automatically recognizable by an internal or external control device, in particular by means of the above-mentioned clamping device or another clamping device.

The interplay of the feed unit, counter-unit and cutting edge can consequently not only facilitate the assembly and the dismantling, but additionally enables an automatic recognition of the assembly state in accordance with the intended purpose.

Provision is preferably made that a component to be mounted earlier can be finally positioned and/or secured by a component to be mounted later.

In accordance with a preferred further development, the output device is configured to generate a compressed air flow to influence the ejected material web. With such an air flow, it is possible to influence the front end section of the material web in the cutting region in a respective desired manner.

The compressed air flow is preferably variable in time and/or in space. The compressed air flow can in particular be variable over the width of the material web.

Provision is preferably made that the compressed air flow is variable within a respective time window corresponding to an interleaved sheet.

In accordance with a preferred embodiment, the output device is configured to eject material webs on multiple tracks, wherein the compressed air flow is controllable individually per track.

An adjustment device can be provided to control the compressed air flow, with the adjustment device preferably being active at a compressed air outlet of the output device.

Provision can be made that the compressed air flow can be automatically configured in dependence on a respective application. This can take place automatically, in particular via a program respectively selected at an internal or external control device. Alternatively, a manual configuration can be provided, in particular at an internal or external operating unit.

In accordance with a further embodiment, an internal or external control device can be provided which is configured to coordinate the ejection of the material web and the generation of the compressed air flow.

An output device which is suitable for a multitrack operation and which has a particularly compact design and an integrated counter-unit can be implemented if, in accordance with a further embodiment, the output device is configured to eject material webs on multiple tracks and the feed gap is formed for each track by a pair comprising a driven feed roll and a pressing unit, wherein the respective feed roll of the one pair and the pressing unit of a directly adjacent pair are together rotatably drivable about a common axis as a two-track unit and the pressing units are each provided with a freewheeling function.

To implement an output device having an equal number of more than two tracks, in accordance with a further development, a plurality of two-track units can be provided next to one another and the respective pressing unit of the one two-track unit and the feed roll of a directly adjacent two-track unit can be supported at one another and be rotatable with respect to one another at least in the radial direction.

If a multitrack slicer is provided with an interleaver or underleaver in accordance with the disclosure, a common control device is preferably provided which is configured to coordinate the slicing of the products and the provision of the interleaved sheet material individually per track.

BRIEF DESCRIPTION OF THE DRAWINGS

The disclosure will be described in the following by way of example with reference to the drawing. There are shown:

FIGS. 5a to 5h illustrate different views of embodiments for the attachment of the feed unit, counter-unit and cutting edge to a stationary mount fastened to a machine frame of a slicer.

DETAILED DESCRIPTION

Figure 1:
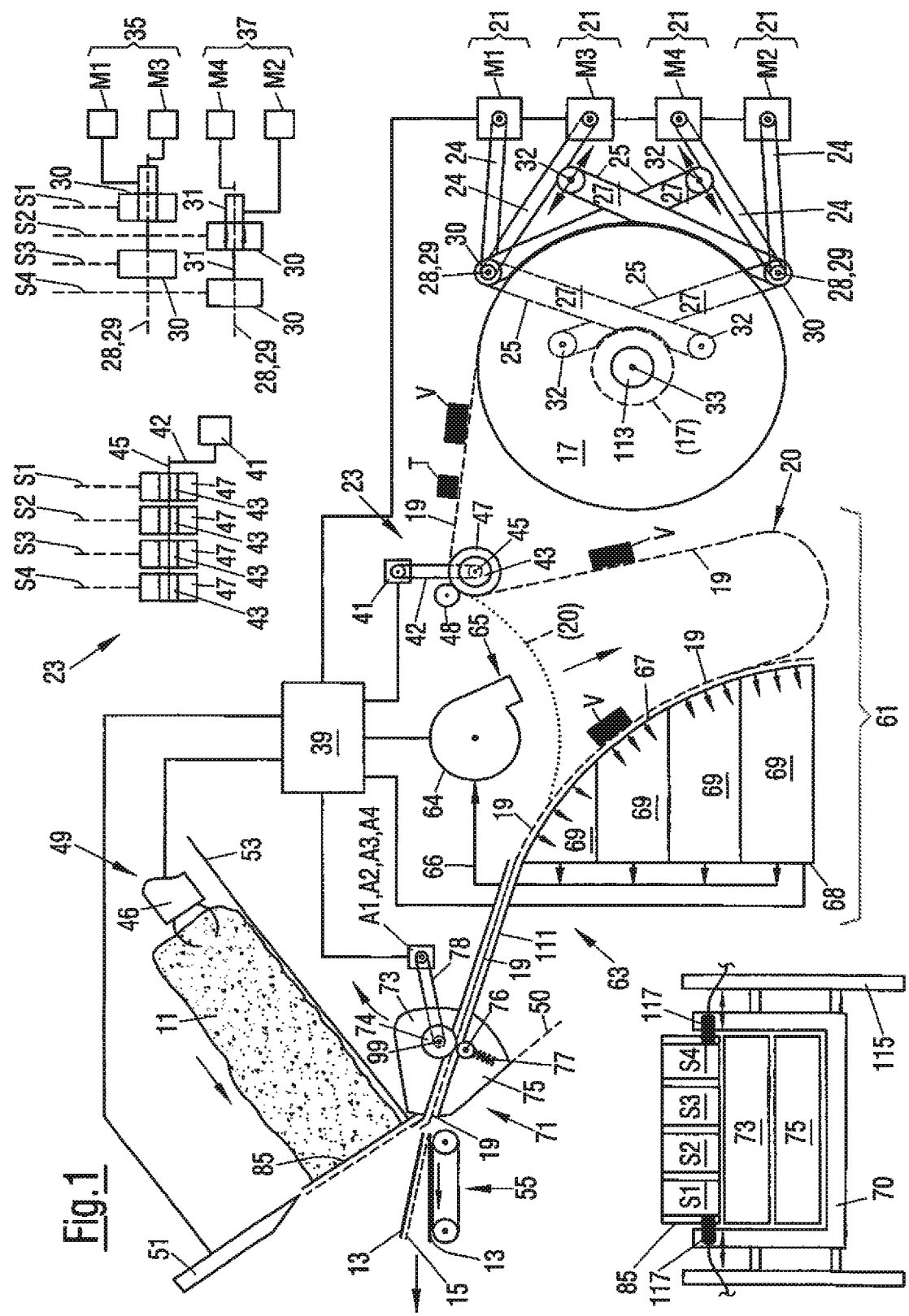
FIG. 1 schematically, a side view of a slicer with an interleaver in accordance with an embodiment of the disclosure and three individual representations shown schematically.

The large representation in FIG. 1 shows a multi-track high-speed slicer, that is an apparatus for a multitrack slicing of food products such as sausage, meat or cheese, in a schematic side view which is not to scale.

In the embodiment shown, the slicer is operated on four tracks. Four products 11 to be sliced are disposed next to one another on a product support 53 inclined to the horizontal. A product feed 49 comprises for each track, that is for each of the four products 11, a product holder 46, also called a product gripper, which holds the product 11 at the rear end and supplies it in the supply direction indicated by the arrow to a cutting plane 50 which extends perpendicular to the product support 53 and in which a cutting blade 51 moves by whose cutting edge the cutting plane 50 is defined.

The cutting blade 51 can be a so-called scythe-like blade or spiral blade which has a cutting edge extending in a scythe-like form or spiral form and which only rotates about a blade axis, not shown. Alternatively, the cutting blade 51 can be a so-called circular blade which has a circular cutting edge, which rotates about its own blade axis and which additionally revolves in a planetary motion about an axis extending offset in parallel from the blade axis in order to produce the cutting movement relative to the products 11 required to cut off slices 13 from the products 11.

The product feed 49 can be operated individually per track, i.e. the product holders 46 can generally move independently of one another in the supply direction and thus supply the individual products 11 to the cutting plane 50 at different speeds and with different speed profiles. This also applies if product support belts which are drivable individually per track are used instead of a passive product support 53 as the product feed 49 instead of the product holders 46 or in addition to the product holders 46. The slicing process can hereby be individually controlled in each track independently of the respective other tracks, in particular with the aim of an exact weight production of slices 13 or portions formed from a respective plurality of slices 13 while taking into account the individual product properties such as in particular weight distribution and cross-sectional profile.

It is also possible to stop the product holder 46 in a track or to move it against the supply direction in order temporarily not to cut off any slices 13 from the respective product 11 while the products 11 continue to be sliced in the other tracks. The product feed 49 on individual tracks can also take into account the cutting movement of the cutting blade 51 which is characterized in that a respective slice 13 is indeed cut off from all the products 11 per cutting movement—that is per revolution or rotation of the cutting blade 51—but this does not take place at the exact same time, the cut-off slices 13 of the products 11 rather falling onto the support surface, formed by a so-called portioning belt 55 here, consecutively in time due to the passage of the cutting blade 51 through the products 11 which requires a specific duration of time.

For many products 11, for example ham or some types of cheese, it is desired for the respective slices 13 which are disposed above one another and, for example, form a stack-like portion or an overlapping portion to be separate from one another so that they can later be individually removed more easily by a consumer from a package including the portion. In the field of high-speed slicers, this purpose is served by so-called interleavers, that is apparatus for the provision of web-like interleaved sheet material, by means of which it is possible to introduce interleaved sheets 15 between directly consecutive slices 13.

There are interleavers in different designs. In accordance with a widespread mode of operation, which is also provided for the interleaver in accordance with the disclosure shown here, the endless material webs 19 are ejected in the region of the cutting plane 50 coming from below in accordance with the clocking predefined by the cutting movement of the cutting blade 51. This takes place such that the front end of the respective material web 19 is disposed in front of the cut surface of the respective product 11 and, together with the slice 13 which is cut off next, is cut off from the material web 19 by means of the cutting blade 51 and thus forms an interleaved sheet 15. This interleaved sheet comes to lie on the portioning belt 55 or on the previously cut-off slice 13 and beneath that slice 13 with which the interleaved sheet 15 was previously cut off together.

The design and the mode of operation of such slicers and also the basic principle of an interleaver are sufficiently known to the skilled person so that it is not necessary to look at them in any more detail in the following.

The interleaver in accordance with the disclosure which is integrated into the slicer is of multitrack design and is configured to continuously provide the interleaved sheet material on individual tracks. The design and the mode of operation of the interleaver will be explained in the following using the example of a four-track operation. The interleaver in accordance with the disclosure can, however, also be operated on one track, on two tracks or on three tracks by a comparatively simple conversion. The respective operating mode is, for example, dependent on the products to be sliced, on the conveying and sorting devices connected downstream and on the type of packaging or on the packaging machine. The interleaver in accordance with the disclosure is generally designed such that an operation with any desired number of tracks and consequently also with more than four tracks is possible.

For each of the four tracks S1, S2, S3 and S4, the provision of the interleaved sheet material comprises the removal of the material from a material store formed by a material roll 17, the storage of material in a loop store 61, the guidance of the material in a region between the loop store 61 and an output device 71, and the outputting of the material by means of the output device 71.

For each track, the removal of the material web 19 from the material roll 17 comprises the rolling off of the material web 19 by means of a roll-off drive 21 and the conveying of the material web 19 into the loop store 61 by means of a conveying device 23 common to all the tracks. The individual roll-off drives 21 and the common conveying device 23 form a removal device of the interleaver in accordance with the disclosure.

For each track, the storage of the material web 19 takes place by the formation of a material loop 20 in the loop store 61. The individual material webs 19 or loops 20 are laterally guided by dividing walls (not shown) in the loop store 61 to ensure the accuracy of the material webs 19 on the tracks.

In the embodiment shown, the total transport path for the material web 19 between the loop store 61 and the output device 71 is formed by a shaft 111 in which the individual material webs 19 are guided. Such a design is indeed possible in practice. However, further devices which will not be looked at in any more detail at this point are preferably provided between the loop store 61 and the output device 71 in addition to a purely guidance section such as is formed by the shaft 111 in FIG. 1.

The outputting of the individual material webs 19 respectively comprises the removal of the material web 19 from the loop store 61 and the ejection of the material web 19 into the cutting region, that is before the cut surface of the respective product 11, as explained above. The material web 19 is pulled from the loop store 61 on the removal. The material web 19 is in this respect simultaneously advanced into the cutting region and is thus ejected.

These individual regions of the interleaver in accordance with the disclosure, that is the removal device comprising the individual roll-off drives 21 and the common conveying device 23, the loop store 61 and the output device 71, will be described in more detail in the following. If not otherwise stated, the respective description of the function and design applies to each of the individual tracks.

The interplay of these individual functional units of the interleaver with one another and also the interplay of the interleaver with the functional units of the slicer, in particular—but not exclusively—with the cutting blade 51 and with the product feed 49, is controlled by a control device 39 which can be the central control device of the slicer and thus a control device which is external with respect to the interleaver. Alternatively, the interleaver can have an internal control device which cooperates with a control device of the slicer.

Furthermore, the interleaver can additionally receive external signals e.g. from a camera system which monitors the portions produced by means of the slicer or the portion formation from the cut-off slices.

The material rolls 17 of the individual tracks are rotatably supported about a common axis of rotation 33 defined by a common mandrel. Each material roll 17 comprises a roll core 113 at which the material web 19 is wound. The material rolls 17 are freely rotatable at the mandrel to the extent that the rotational drive for the material rolls 17 for the rolling off of the material webs 19 does not takes place via this common mandrel.

Instead, a separate roll-off drive 21 is provided for each material roll 17. Each roll-off drive 21 comprises a drive arm 27 pivotable about a pivot axis 28. Each drive arm 27 comprises a support, not shown, to whose one end a drive roller 30 is attached and to whose other end a deflection roller 32 is attached. An endless belt 25 revolving around the drive roller 30 and the deflection roller 32 serves as a drive member for the material roll 17; it is configured as a friction belt and serves to cooperate in a force-transmitting manner with the wound material web 19 of the material roll 17 via the turn facing the material roll 17.

As is also shown in the schematic representation at the top right in FIG. 1, each drive roller 30 is rotationally fixedly connected to a drive shaft 31 which can be set into rotation by means of a drive motor M via a drive belt 24 in order to drive the friction belt 25 and to roll the material web 19 off from the material roll 17 in this manner.

Since the four tracks S1, S2, S3 and S4 of the interleaver extend in parallel and four material rolls 17 are thus also seated next to one another on the common mandrel, the four drive arms 27 are accordingly arranged offset from one another in the transverse direction. This is indicated in the schematic representation at the top right in FIG. 1 by the association of the tracks S1 to S4 with the individual drive rollers 30 of the drive arms 27.

The spatial arrangement of the drive arms 27 and the manner of the rotational drive for the drive rollers 30 are particularly advantageous. The axes of rotation 29 of the drive shafts 31 and thus of the drive rollers 30 each coincide with the pivot axis 28 of the respective drive arm 27. In this respect, a single common pivot axis 28 is not provided for all the drive arms 27. Instead, the drive arms 27 are combined pair-wise, wherein a common pivot axis is provided for each pair. Two drive arms 27 pivotable about an upper pivot axis 28 are in this respect associated with the tracks S1 and S3, whereas two drive arms 27 which are pivotable about an lower pivot axis 28 are associated with the tracks S2 and S4.

In the embodiment shown, all the drive arms 27 have the same length and the upper pivot axis 28 and the lower pivot axis 28 are disposed at a circular cylinder about the common axis of rotation 33 of the material rolls 17. Alternatively, the drive arms 27 can be of different lengths and the pivot axes 28 can be arranged in a different manner.

A respective coaxial shaft drive 35 or 37 is provided for both the upper pair of drive arms 27 and the lower pair of drive arms 27. The two drive motors M1 and M3 belong to the upper coaxial shaft drive 35, whereas the lower coaxial shaft drive 37 comprises the two drive motors M4 and M2. A motor M3 or M4 respectively is connected to an inner drive shaft 31 for the drive roller 30 which is disposed further away axially, whereas the respective other motor M1 or M2 is connected to a hollow shaft 31 which surrounds the inner drive shaft 31 and on which the more closely disposed drive roller 30 is seated.

As already mentioned, the drive motors M1 to M4 are not directly connected to the drive shafts 31, but rather via drive belts 24. This enables a displaced or an offset positioning of the motors and consequently an ideal use of the space available in the interleaver. Furthermore, the interleaver can hereby be designed comparatively narrow since the motors M1 to M4 respectively do not need to be positioned in the axial extension of the drive shafts 31.

A further advantage of this drive concept comprises all of the motors M1 to M4, including the drive belts 24, only being arranged at one side of the interleaver. This region is therefore more easily accessible via the other side of the interleaver. It is particularly advantageous that all the drive rollers 30, and thus the drive arms 27, can be plugged onto the respective drive shaft 31 and can be removed from it from the same side-namely starting from the "preferred" operating side. This not only facilitates cleaning and servicing, but also enables a simple and fast conversion, for example, when a slicer and interleaver operation should be converted to a different number of tracks.

These advantages also apply to the arrangement of the material rolls 17 which can all be plugged onto the common mandrel and can be removed from it from the same side— and indeed from the same side as the roll-off drives 21. It is therefore sufficient if the functional regions of the interleaver are only accessible from one side.

A pivot drive, not shown, is additionally provided for each drive arm 27. The pivot drive can, for example, comprise a piston-in-cylinder arrangement. The drive arms 27 can hereby each be pivoted into a passive state in which the friction belt 25 is out of frictional engagement with the material roll 71. This passive state can, for example, be a parked position into which the drive arms 27 are pivoted when new material rolls 17 are to be inserted.

The fact that in accordance with the disclosure the respective friction belt 25 of the roll-off drives 21 engages in a force-transmitting manner at the outer periphery of the material roll 17 to roll off the material web 19 has the advantage that the roll-off rate, i.e. the web length rolled off per time unit, is independent of the current diameter of the material roll 17 and thus of its degree of consumption. The above-mentioned pivot drives (not shown) can each pretension the drive arm 27 in the direction of the axis of rotation 33 of the material roll 17 with a predefined force or with a predefined torque such that the drive arm 27 is adjusted to track the diameter of the material roll 17, which decreases during operation, and the frictional engagement between the friction belt 25 and the wound material web 19 is always of the same magnitude.

A material roll 17 which is almost consumed and whose diameter is only a little larger than the diameter of the roll core 113 is shown by a dashed circle. An upper drive arm 27 and a lower drive arm 27 are shown by a dashed line to illustrate a state pivoted correspondingly far in the direction of the axis of rotation 33 of the material rolls 17.

The operation of the roll-off drives 21 depends on demands of the central control device 39. If less material or temporarily no material is required in a track, the roll-off rate of the respective track can be correspondingly changed by reducing the revolution speed of the friction belt 25 or by switching off the drive motor M. In a non-driving state with the drive motor M switched off, the frictional belt 25 of the respective drive arm 27 remains in frictional engagement with the wound material web 19; it is therefore not, for instance, pivoted out of engagement with the material roll 17 by means of the above-mentioned pivot drive (not shown). This has the advantage that the frictional belt 25 is active as a brake for the material roll 17, whereby a further rotation of the material roll 17 caused by inertia is prevented.

The removal of the material webs 19 from the material rolls 17 not only comprises the rolling off by means of the above-explained roll-off drives 21, but also the conveying of the material webs 19 into the loop store 61. For this purpose, the removal device comprises a conveying device 23 which is additionally shown schematically at the top of FIG. 1 at its center.

The conveying device 23 comprises a conveying roller 47 for each track S1 to S4, said conveying roller forming a conveying gap for the respective material web 19 together with a counter-roller 48. All of the conveying rollers 47 are seated on a common drive shaft 45, that is they are only driven together, and indeed via a common drive motor 41 which sets the common drive shaft 45 of the conveying rollers 47 into rotation via a drive belt 42.

The operation of this conveying device 23 individually per track is achieved in that a slip clutch 43 which is arranged between the conveying roller 47 and the common drive shaft 31 is associated with each conveying roller 47. The slip clutches 43 are each magnetic clutches whose switching points can be set.

The conveying device 23 is operated via the control device 39 such that the material webs 19 are each always held under tension between the respective material roll 17 and the respective conveying roller 47. During operation, the common drive shaft 45 can rotate at a constant rotational speed which is coordinated with an expected operation of the interleaver for the respective cutting program of the slicer. If the roll-off drive 21 is stopped in a track or if the roll-off rate is reduced in a track, an active intervention in the operation of the conveying device 23 is not required since a roll-off rate in a track that falls below the conveying rate of the conveying device 23 is taken up by the clutch 43 of this track without the respective material web 19 being excessively strained or even tearing.

An advantage of this concept comprises the conveying device 23 only requiring a single drive comprising a drive motor 41 and a drive belt 42 and only requiring a single common drive shaft 45 for all the tracks S1 to S4 and no design or technical control measures being necessary to implement an active operation of the conveying device 23 individually per track.

If the clutch 43 is not currently active in one of the tracks and temporarily no material is thus conveyed into the loop store 61 in this track, the conveying rate of the conveying device 23 determines the web length entering the loop store 61 per time unit in each track. Since the operation of the individual roll-off drives 21 which is controlled via the control device 39 ultimately decides whether and how much material is rolled off from the respective material roll 17 per time unit in the individual tracks, the individual conveying rates into the loop store 61 are ultimately determined by the individual roll-off rates.

The track-specific material requirement in the cutting region is determined by the control device 39 and is ensured by a corresponding track-specific control of the roll-off drives 21. The loop store 61 ensures a decoupling in each track between the sluggish material roll 17, on the one hand, and the highly dynamic output device 71, on the other hand, which, in the cycle of the cutting blade 51, has to output a web length corresponding to the length of the respective required interleaved sheet 15, in each case on short notice. Such a highly dynamic cyclic ejection of relatively long material sections would be incompatible with a pulling off of the material web 19 directly from the material roll 17.

The control device 39 therefore ensures that a web length which is sufficiently large for a disruption-free output operation of the output device 71 is available in the loop store 61 in each track at all times in that a material loop 20 which is always sufficiently large is provided in the loop store 61.

The formation and maintenance of these material loops 20 in the individual tracks is achieved by a sufficiently large "replenishment" by means of the removal device, that is by means of the roll-off drives 21 and the conveying device 23, on the one hand, and by an air circuit comprising a combined suction and blowing device 63, 65, on the other hand.

The suction side of a fan 64 belonging to this combined suction and blowing device 63, 65 is connected via a suction line 66 to a vacuum housing 68 in which a plurality of vacuum chambers 69 are formed which are separate from one another in a technical flow aspect within the housing 68. The pressure in each vacuum chamber 69 can be measured by means of sensors, not shown, and can be provided to the control device 39.

The housing 68 is bounded toward a loop region of the loop store 61 by a curved contact surface 67 in which openings are formed via which air can move from the loop region into the individual vacuum chambers 69, such as is indicated by the small arrows. The vacuum chambers 69 are each connected to the suction line 66 and thus to the suction side of the fan 64 whose pressure side is directed into the loop region, such as is indicated by the arrow in FIG. 1.

This air circuit has the effect that a designated material loop 20 is always formed and that the material web 19 contacts the contact surface 67 of the vacuum housing 68 in the designated manner. Since the material web 19 is sucked toward the contact surface 67 due to the vacuum present in the vacuum chambers 69, the contact surface 67 simultaneously serves as a brake for the material webs 19. The material webs 19 are hereby always held under a light tension, whereby the material webs 19 are prevented from compressing when the output device 71 which works in the cutting cycle pulls the material webs 19 out of the loop store 61 in a highly dynamic manner. The braking effect of the contact surface 67 or of the vacuum chambers 69 is in this respect set such that this highly dynamic removal process is not impaired.

The control device 39 can recognize by means of the mentioned pressure sensors in the vacuum chambers 69 which vacuum chamber 69 is covered by the material web 19 and which is not. A measure for the current size of the material loop 20 in the loop region of the loop store 61 can be derived from this information in a simple manner with sufficient accuracy. The material web 19 drawn as a dashed line is shown with a maximum loop size in FIG. 1. The extent of the material web 19 with a minimal loop size, in which only the uppermost vacuum chamber 69 is partly covered by the material web 19, is indicated by a dotted line.

The control 39 can activate or deactivate the individual roll-off drives 21 individually per track in accordance with the individual loop sizes determined in this manner or it can change the individual roll-off rates by a corresponding control of the motors M1 to M4 to ensure that a sufficiently large material loop 20 is present for each track at all times to maintain the above-explained decoupling between the respective track of the output device 71 and the associated material roll 17.

The output device 71 is likewise configured for an operation individually per track. For this purpose, a feed unit 73 comprises a feed roll 74 for each of the tracks S1 to S4, as will be explained in more detail in the following with reference to two possible embodiments in accordance with FIGS. 2 and 3. The feed rolls 74 have a common axis of rotation 99, wherein a separate drive motor A1, A2, A3 or A4 is provided for each feed roll 74 and cooperates via a drive belt 78 with a drive shaft 83 (cf. FIG. 2) to which the respective feed roll 74 is rotationally fixedly connected.

Figure 2:
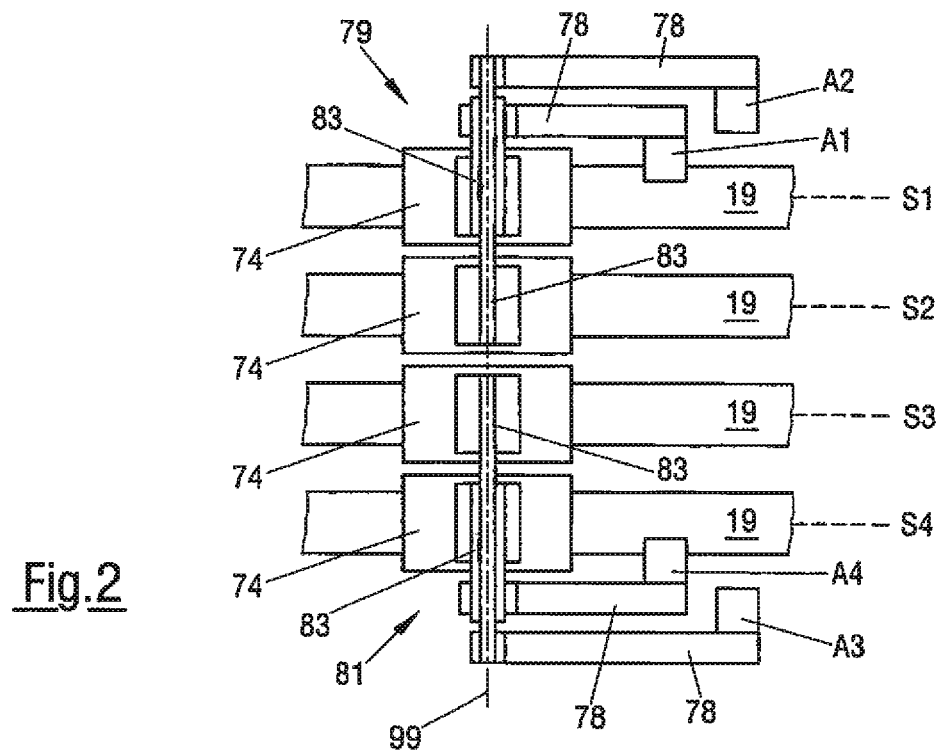
FIGS. 2-4 schematically in each case, an embodiment of a feed unit of an interleaver.

As FIG. 2 shows, the two feed rolls 74 for the tracks S1 and S2 are driven via a right coaxial shaft drive 79, whereas a left coaxial shaft drive 81 drives the two feed rolls 74 of the other two tracks S3 and S4. The respective inwardly disposed feed roll 74 is driven via an inwardly disposed drive shaft 83, whereas the respective outwardly disposed feed roll 74 is driven via a hollow shaft 83 surrounding the inwardly disposed drive shaft 83.

In this manner, a drive individually per track of four feed rolls 74 arranged next to one another at a common axis of rotation 99 can be implemented for the feed unit 73 of the output device 71.

Figure 3:
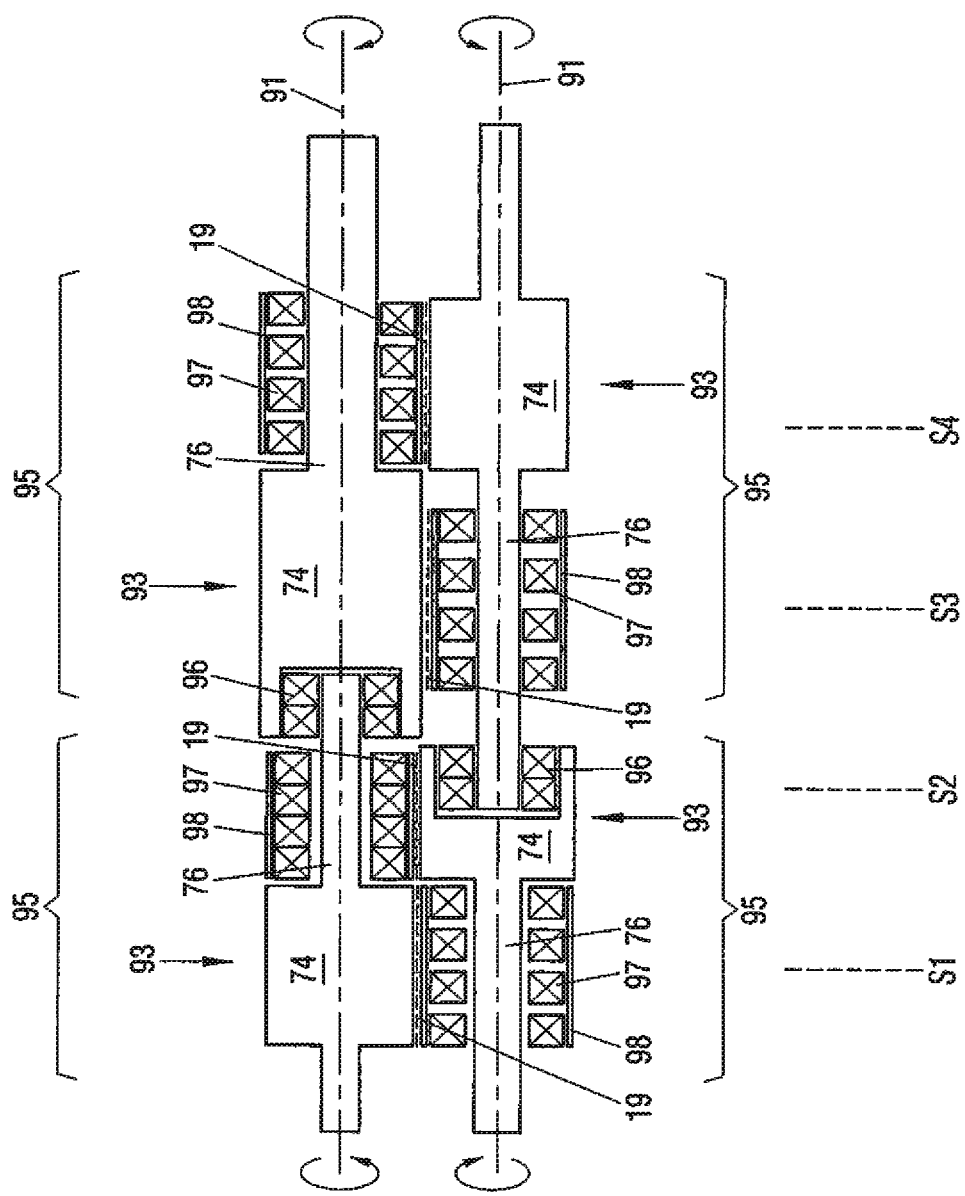

An alternative design for a four-track drive comprising four individually drivable feed rolls 74 is schematically shown in FIG. 3. Two axes of rotation 91 which extend in parallel are provided here, wherein a respective two two-track units 95 are arranged next to one another at each of the two axes 91. Each two-track unit 95 comprises a feed roll 74 and a pressing roller 76 which are rotationally fixedly connected to one another and which can, for example, be formed in one piece with one another. Each feed roll 74 cooperates directly with a respective material web 19, whereas the co-rotating pressing roller 76 is provided with a freewheeling function with respect to the material web 19 in its track. The freewheeling function is implemented in that the pressing roller 76 supports a freely rotatable pressing sleeve 98 for the material web 19 via a rolling element bearing 97.

A feed roll 74 at the one axis 91 and a pressing unit comprising the pressing roller 76 and the pressing sleeve 98 at the other axis 91 therefore form a pair 98 for each of the tracks S1 to S4, said pair forming a feed gap for the respective material web 19.

Each two-track unit 95 can, for example, be rotated about the respective axis 91 via a drive belt, not shown, by means of an associated drive motor (not shown), wherein the two axes 91 are driven with an opposite rotational sense. Adjacent two-track units 95 at a common axis 91 are rotatable relative to one another. For this purpose, a respective axial extension of a pressing roller 76 engages into an end-face depression of the adjacent feed roll 74 at which the extension of the pressing roller 76 is supported in the radial direction by a rolling element bearing 96.

Due to this arrangement, a feed individually per track for four tracks S1 to S4 disposed next to one another is implemented as a particularly compact unit into which the counter-units or pressing units 76, 98 associated with the individual feed rolls 74 are integrated. A division into a feed unit, on the one hand, and into a counter-unit, on the other hand, as in the embodiment in accordance with FIGS. 1 and 2, is consequently not provided here.

As FIG. 1 shows, in the embodiment shown here, a counter-unit 75 is provided in addition to the feed unit 73 comprising the four feed rolls 74 which can be driven individually per track. The counter-unit 75 can have at least one associated pressing roller 76 for each feed roll 74, which pressing roller is supported in an elastic or a resilient manner such as is indicated schematically in FIG. 1 by the suspension 77 and is indicated schematically in FIG. 4 by a piston-in-cylinder arrangement 109 configured as a suspension.

Alternatively, the counter-unit 75 can have a plurality of counter-elements arranged distributed along an axis extending in parallel with the axis of rotation 99 of the feed rolls 74, in particular counter-elements in the form of individually resiliently supported pressing rolls or pressing rollers each having a diameter which is small with respect to the feed rolls 74. These counter-elements which are not driven form a feed gap for one of the material webs 19 with each of the feed rolls 74. Such counter-units or pressing units for output devices of interleavers are generally known so that it is not necessary to look at them in more detail.

As the representation at the bottom left in FIG. 1 shows schematically, it is a special feature of the output device 71 that the feed unit 73 and the counter-unit 75 are attached to a stationary mount 70, fastened to a machine frame 115 of the slicer, together with a cutting edge 85 which is also called cutting glasses, a molded tray or a counter-blade.

The mount 70 and the components counter-unit 75, feed unit 73 and cutting edge 85 are configured corresponding to one another such that these components can only be mounted at the mount 70, without tools, in a single order.

In this respect, the counter-unit 75 is first arranged at the mount 70. The counter-unit 75 is fixed and secured in its desired position by a subsequent attachment of the feed unit 73. The attachment of the feed unit 73 requires a combined turn-pivot movement into an end position which—as indicated by the arrow in the large representation of FIG. 1—has the consequence that, on the attachment of the feed unit 73, all the drive belts 78 of the drive motors A1 to A4 are simultaneously tensioned which were previously, in the relaxed state, placed around the drive shafts 83 of the feed rolls 74 projecting at both sides. Accordingly, the drive belts 78 are automatically relaxed on the removal of the feed unit 73.

Finally, the cutting edge 85 is attached to the mount 70. The cutting edge 85 in turn positions and secures the feed unit 73 in its desired position. A clamping device 117 comprising two clamping pins 117 which are pneumatically adjustable relative to the mount 70—as indicated by the two double arrows-positions and subsequently secures the cutting edge 85 and thus all three components counter-unit 75, feed unit 73 and cutting edge 85 at the mount 70.

The mount 70 can furthermore serve for the attachment of further devices. Thus it may e.g. be necessary in practice to set the so-called cutting gap between the cutting blade 51 and the cutting edge 85 to a specific value. In this connection, sensors such as vibration sensors can be used which can be attached to the mount 70 or integrated into the mount 70.

A simple and reliable assembly and dismantling of the three named components without tools is implemented in this manner.

A query can additionally take place by the control device 39 by means of the clamping pins 117 and it can be recognized whether a cutting edge 85 is present at all and whether—in dependence on the respective set cutting program—the correct cutting edge 85 has been mounted. When a cutting edge 85 is missing, the clamping pins 117, for example, extend further than when the correct cutting edge 85 is present—this incorrect positioning of the clamping pins 117 can be recognized by the control device 39.

As already explained above, the ejection of the material web 19 by means of the output device 71 takes place such that the front end of the material web 19 is disposed in front of the cut surface of the respective product 11 so that it can be cut off from the material web 19 by means of the cutting blade 51 together with the slice 13 to be cut off next and can thus form an interleaved sheet 15.

To influence the front end of the material web 19 in this sense, a vacuum is generated by means of an air flow in the region between the material web 19 and the cut surface of the product 11 and has the effect that the front end of the material web 19 is placed against the cut surface. This concept is generally known. The air flow can e.g. be generated in that compressed air is ejected via a gap extending transversely to the material web 19 or via a plurality of openings arranged distributed in the transverse direction.

Figure 4:
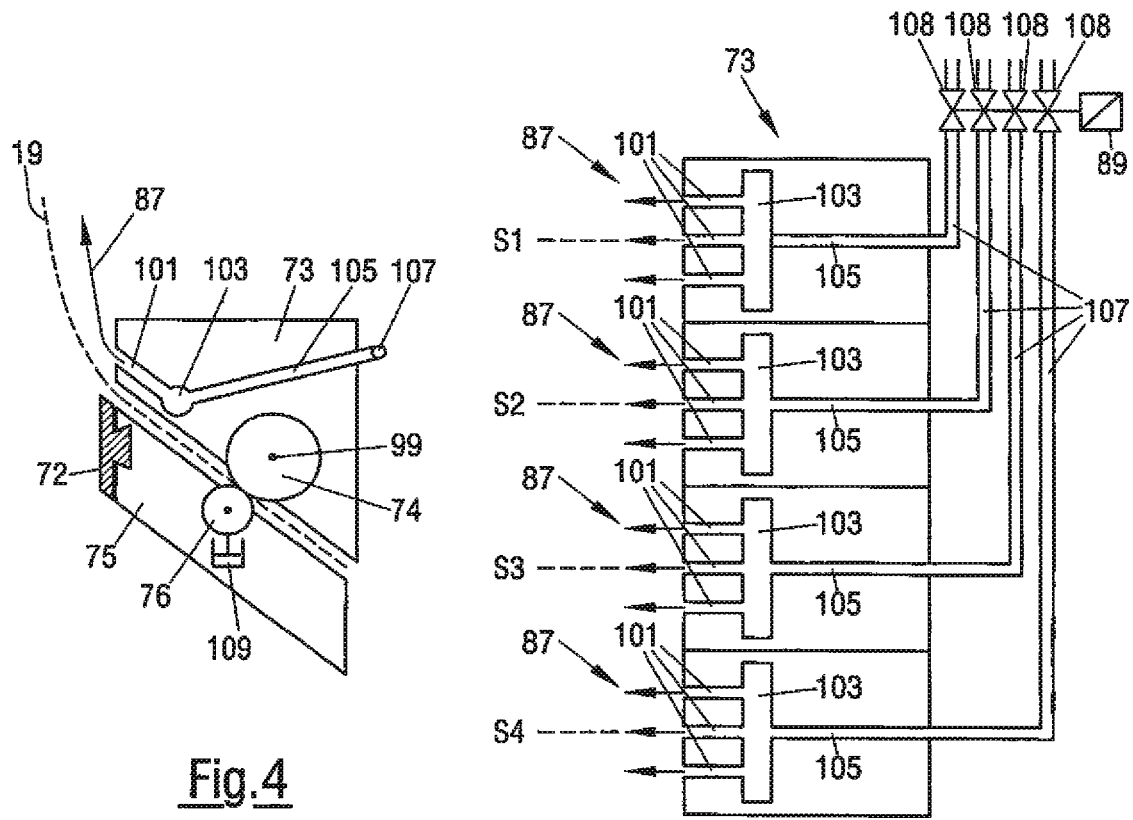

As FIG. 4 shows, in accordance with the disclosure, an individually variable air flow 87 is generated for each of the tracks S1 to S4 via the feed unit 73 such that the free ends of the individual material webs 19 can be influenced individually per track. The individual air flows 87 can be varied individually per track in a time regard and with respect to their strength.

This is achieved in that, for each track S1 to S4, a plurality of outlet openings are arranged distributed transversely to the respective material web 19 in the front region of the feed unit 73 above the outlet gap for the individual material webs 19 which is formed by the feed unit 73 and by the counter-unit 75.

Each outlet opening belongs to an outlet passage 101 formed in the feed unit 73, with all the outlet passages 101 starting from a common distributor space 103 which is in communication with a compressed air source, not shown, via an inlet passage 105 and via a supply line 107. Each supply line 107 is provided with a controllable valve 108. The valves 108 can be controlled individually per track via an adjustment device 89.

The time behavior and the strength of the respective air flow 87 can hereby be varied for each of the tracks S1 to S4 independently of the respective other tracks.

The rail 72 also shown in FIG. 4 is a replaceable wear part which preferably comprises plastic and which serves as a cutting edge which cooperates with the cutting blade 51 on the cutting through of the individual material webs 19.

The interleaver can be configured to automatically connect consecutive material webs 19 to one another in each of the individual tracks S1 to S4. In FIG. 1, possible positions are schematically shown at which a connection device V integrated into the interleaver can be arranged.

A change device which is configured to automatically replace a respective used material roll 17 with a material roll 17 to be used is not shown in FIG. 1. The change device can be arranged outside the interleaver or can at least partly be integrated into the interleaver. A separate change device can be provided for each of the tracks S1 to S4. Alternatively, a plurality of tracks or all the tracks can have a common change device.

A multitrack design of the interleaver can also be implemented in that a common rotatably supported material roll 17 is provided for a plurality of tracks S, with a device T for dividing the material web 19 into a plurality of individual material webs 19 being provided for the material web 19 of this common material roll 17. A possible position at which such a division device T integrated into the interleaver can be arranged is schematically indicated in FIG. 1. Only one roll-off drive 21 is then provided for these tracks S, i.e. for the respective material roll 17.

In this respect, it is e.g. possible that a four-track interleaver is implemented in that two material rolls 17 are provided with which a roll-off drive 21 and a division device T are respectively associated, i.e. from whose material web 19 a respective two individual material webs 19 arise such that four individual material webs 19 move to the devices arranged downstream of the division devices T, such as in the case that a separate material roll 17, and no division device T, is provided for each track S.

Different combinations are conceivable. For example, in a four-track interleaver, a respective separate material roll can e.g. be provided for two tracks and a common material roll and a division device can be provided for two further tracks.

A handling of the individual material webs 19 individually per track in a continuous manner is consequently possible in the interleaver in accordance with the disclosure such that the interleaver can be operated by means of the control device 39 in dependence on the cutting process in such a manner that the interleaver operation on individual tracks can be perfectly coordinated with the cutting operation on individual tracks.

It must also be mentioned for reasons of completeness that an interleaver configured on one track or temporarily operated on one track can have a roll-off drive, such as is respectively described above for one of the tracks S1 to S4.

The embodiment of FIGS. 5a to 5h shows how the attachment of the feed unit 73, counter-unit 74 and cutting edge 85 shown schematically at the bottom left in FIG. 1 can, for example, take place in a specific manner, said cutting edge also being called cutting glasses due to the openings closed at all sides for the individual tracks S1 to S4 or being called a molded tray due to the matching of the shape of the openings with the cross-sectional shape of the products to be sliced.

The U-shaped mount 70 is attached to the machine frame 115 (cf. FIG. 5b) and comprises a horizontal transverse member and two holders perpendicular thereto. The mount 70 can be aligned relative to the machine frame 115 for the alignment of the components 73, 75, 85 which are in turn aligned with respect to the mount 70 and it can be fixed to the machine frame 115 in the respective correctly aligned position.

A vibration sensor 131 is attached to the holder of the mount 70 at the left in the front view of FIG. 5b; it is e.g. used for setting the cutting gap and can in this respect serve to detect a contact of the cutting blade with the cutting edge 85. This is generally known to the skilled person and therefore does not need to be explained in more detail here.

The clamping pins 117 are supported at the machine frame 115; they respectively project through one of the holders of the mount 70 and cooperate with a conical receiver 130 (cf. e.g. FIG. 5e) of the cutting edge 85 to fix it in the correct alignment.

Figure 5C:
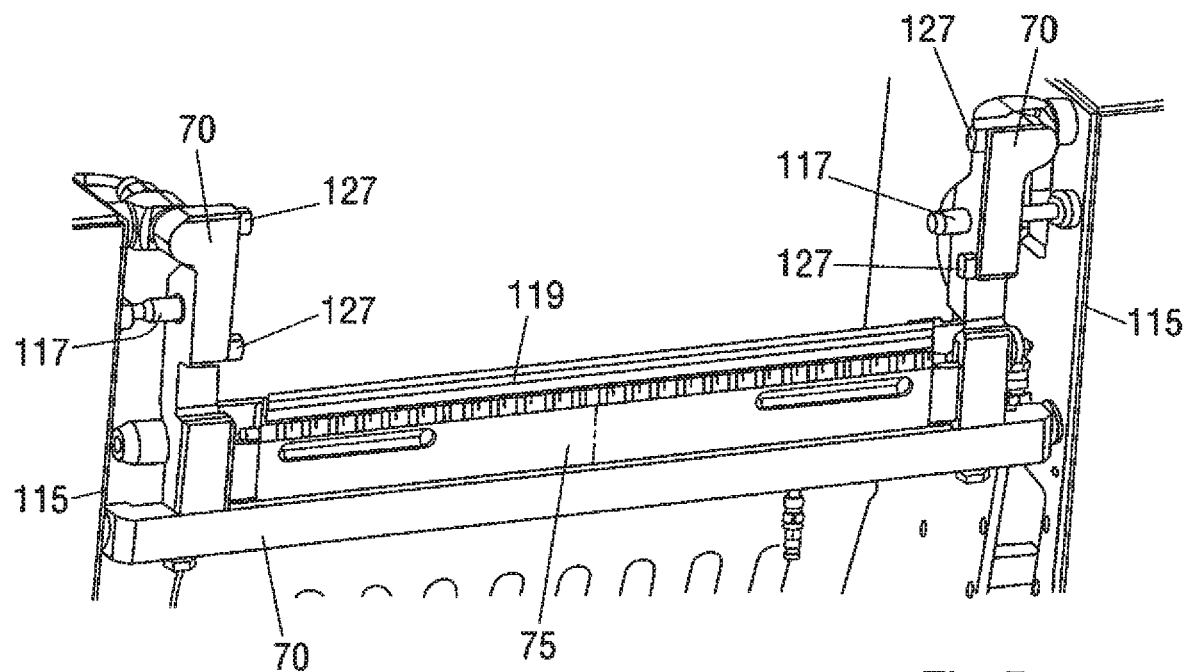
Figure 5D:
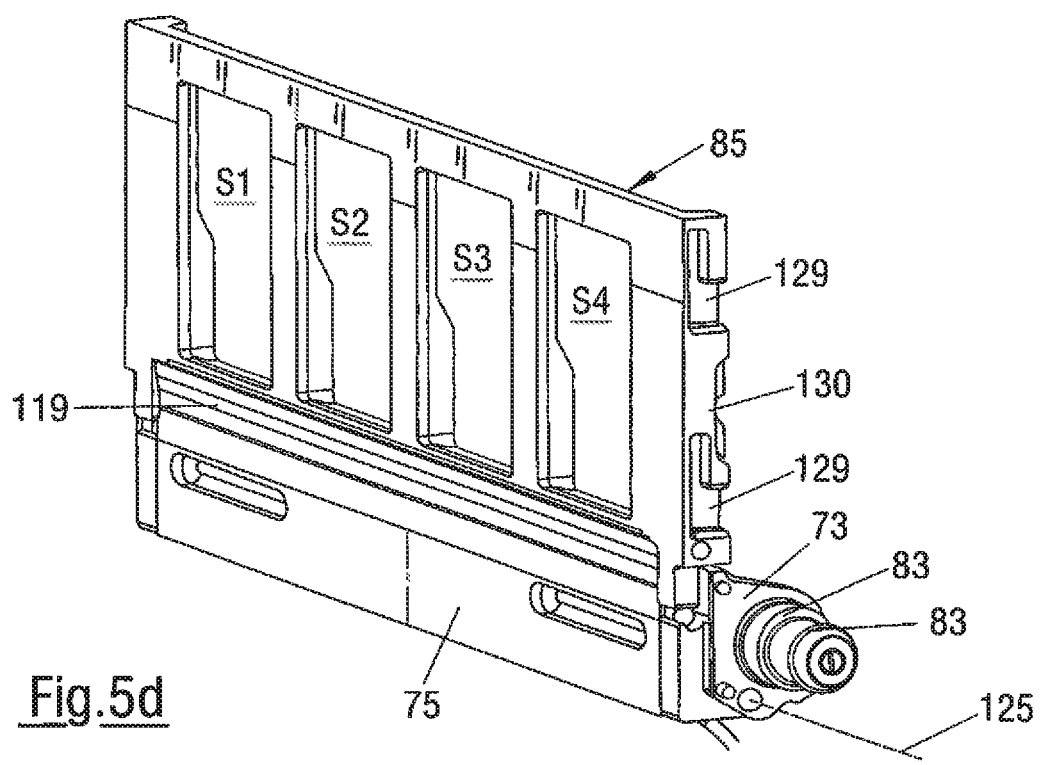

On the assembly, the counter-unit 75 is first positioned at the mount 70. The feed unit 73 is subsequently pivotably coupled to the counter-unit 75, wherein the pivot axis 125 is shown in FIG. 5d. As already described in connection with FIG. 1, the respective laterally accessible ends of the drive shafts 83 (cf. e.g. also FIG. 2) can, when the feed unit 73 is pivoted away from the counter-unit 75, be coupled to the drive belts 78 which are not shown here, but are shown in FIG. 2 and which are tensioned by a pivoting of the feed unit 73 back into the position in accordance with FIG. 5a.

In this position, the individual drive rolls 74 of the feed unit 73 and the pressing roller 76 of the counter-unit 75 then form the feed gap for the material web 19. During operation, the material web 19 exits an outlet gap 133 which is bounded at the front by a rail 119 which is replaceably pushed or plugged onto the counter-unit 75. FIG. 5a shows a section through a drive roll 74 and through the pressing frame 115. The two lateral clamping pins 117 serve for this purpose and respectively cooperate with one of the lateral conical receivers 130 of the cutting edge 85.

The assembly is completed by inserting the cutting edge 85, which takes place without tools as with the counter-unit 75 and the feed unit 73. The cutting edge 85 positions and secures the feed unit 73 and thus the total arrangement of the three components 75, 73 and 85 in their desired position relative to the mount 70 and thus to the machine frame 115. The two lateral clamping pins 117 serve for this purpose and respectively cooperate with one of the lateral conical receivers 130 of the cutting edge 85.

If the cutting edge 85 correct for the respective application is positioned in the correct position, which inter alia requires a groove 121 of the cutting edge 85 formed at the lower side thereof to be placed onto a spring 123 formed at the upper side of the feed unit 73, the clamping pins 117 which are extended after a corresponding command by the control device 39 (cf. FIG. 1) can cooperate with the receivers 130 and can position and fix the cutting edge 85.

This is shown by the sequence of FIGS. 5f and 5g. The clamping pins 117 are each not yet extended in FIG. 5f. The cutting edge 85 has, however, already been coupled to the holders of the mount 70 via lateral cut-outs 129 (cf. also FIG. 5e which shows a rear view of a part of the cutting edge 85) by inwardly projecting pins 127. In FIG. 5g, the clamping pins 117 are each extended into the end position which is possible when the cutting edge 85 is present. While FIG. 5f still shows the assembly position, the correct latching position is consequently shown in FIG. 5g.

The cooperation of the groove 121 of the cutting edge 85 with the spring 121 of the feed unit 73 prevents a deflection of the cutting edge 85 which extends between the holders of the mount 70 transversely to the product feed direction when the cutting edge 85 is acted on by the supplied products 11 (cf. FIG. 1) during operation.

The clamping pins 117 simultaneously serve to detect assembly errors in that the control device 39 is configured to detect both too small an extension path and too large an extension path of the clamping pins 117. FIG. 5h shows the situation when a cutting edge 85 is accidentally missing, whereby an extension restriction for the clamping pins 117 by the receivers 130 of the cutting edge 85 is omitted and the clamping pins 117 consequently extend excessively far. In contrast, the clamping pins 117 cannot extend as far as expected by the control device 39 if e.g. the clamping pins 117 cannot move into the receivers 130 despite a present cutting edge 85. This is e.g. the case when no feed unit 73 is mounted or a feed unit 73 that is seated too low is mounted and the cutting edge 85 seated on the feed unit 73 is consequently likewise arranged too low. This is deliberately made possible by a sufficient vertical length of the lateral cut-outs 129 of the cutting edge 85, but has the result that the extending clamping pins 117 miss the receivers 130 of the cutting edge 85 and consequently cannot extend far enough.

If a cutting operation without an interleaver or underleaver operation is desired, the interleaver unit or underleaver unit comprising the counter-unit 75 and the feed unit 73 can be omitted. So that the cutting edge 85 which is nevertheless required can continue to be correctly positioned, a replacement unit which is of the same construction with respect to the above-explained assembly interfaces, but otherwise has no function, is assembled instead of this interleaver unit or underleaver unit.

PARTS LIST 11 product
13 slice
15 interleaved sheet
17 material roll
19 material web
20 loop
21 roll-off drive
23 conveying device
24 drive belt
25 friction belt, drive member
27 drive arm
28 pivot axis
29 axis of rotation of the drive shafts
30 drive roller
31 drive shaft
32 deflection roller
33 axis of rotation of the material rolls
35 upper coaxial shaft drive
37 lower coaxial shaft drive
39 control device
41 drive of the conveying device
42 drive belt
43 clutch
45 drive shaft
46 product holder
47 conveying roller
48 counter-roller
49 product feed
50 cutting plane
51 cutting blade
53 product support
55 portioning belt
61 loop store
63 suction device, brake
64 fan
65 blowing device
66 suction line
67 contact surface
68 housing
69 vacuum chamber
70 mount
71 output device
72 rail
73 feed unit
74 feed roll
75 counter-unit
76 pressing roller 77 suspension
78 drive belt
79 right coaxial shaft drive
81 left coaxial shaft drive
83 drive shaft
85 cutting edge
87 compressed air flow
89 adjustment device
91 common axis
93 pair
95 two-track unit
96 rolling element bearing
97 rolling element bearing
98 pressing sleeve
99 common axis of rotation
101 outlet passage
103 distributor space
105 inlet passage
107 supply line
108 valve
109 piston-in-cylinder arrangement
111 shaft
113 roll core
115 machine frame
117 clamping pin
119 rail
121 groove
123 spring
125 axis
127 pin
129 cut-out
130 receiver
131 vibration sensor
133 outlet gap
S track
M drive motor of the roll-off drive
A drive motor for the feed roll
V connection device
T division device

The invention claimed is:

1. An apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, the apparatus comprising an output device which is configured to eject at least one material web into an ejection region, the output device comprising at least one driven feed roll and at least one counter-unit which defines a feed gap with the at least one driven feed roll for the material web,
the output device configured to generate a compressed air flow to influence the ejected material web and comprising at least one outlet opening for the compressed air flow to pass out,
the at least one outlet opening connected to a compressed air source via a supply line,
the supply line provided with a controllable valve,
wherein an internal or external control device is provided to control the controllable valve, wherein the strength of the air flow released through the at least one opening is variable in time by controlling the controllable valve accordingly.

2. The apparatus in accordance with claim 1, wherein the duration of the ejection of the material web into the ejection region defines a time window corresponding to an interleaved sheet, wherein the strength of the air flow released through the at least one opening is variable in time during the time window corresponding to an interleaved sheet by controlling the controllable valve.

3. The apparatus in accordance with claim 1, wherein the output device comprises at least two outlet openings for the compressed air flow to pass out, wherein the at least two outlet openings are distributed transversely to the material web ejected into the ejection region, wherein each of the at least two outlet openings is connected to the compressed air source via a respective supply line that is provided with a respective controllable valve, wherein the internal or external control device is configured to control the controllable valves individually.

4. The apparatus in accordance with claim 1, wherein the output device is configured to eject material webs on multiple tracks and comprises at least one outlet opening per track for the compressed air flow to pass out, each of the outlet openings connected to the compressed air source via a respective supply line that is provided with a respective controllable valve, wherein the internal or external control device is configured to control the controllable valves individually.

5. The apparatus in accordance with claim 1, wherein the output device comprises at least two outlet openings for each track, the at least two outlet openings distributed transversely to the material web ejected into the ejection region, wherein each of the at least two outlet openings is connected to the compressed air source via a respective supply line that is provided with a respective controllable valve, wherein the internal or external control device is configured to individually control the controllable valves.

6. The apparatus in accordance with claim 1, wherein an adjustment device is provided to control the compressed air flow.

7. The apparatus in accordance with claim 6, wherein the adjustment device is active at a compressed air outlet of the output device.

8. The apparatus in accordance with claim 1, wherein the compressed air flow can be automatically configured in dependence on a respective application or can be manually configured.

9. The apparatus in accordance with claim 1, wherein the internal or external control device is configured to coordinate the ejection of the material web and the generation of the compressed air flow.

10. The apparatus in accordance with claim 1, wherein the output device comprises a stationary mount at which at least the counter-unit and a feed unit that supports the at least one driven feed roll are detachably mounted, wherein the order in which the detached counter-unit and the detached feed unit are mountable on the stationary mount is predefined.

11. The apparatus in accordance with claim 10, wherein a cutting edge is provided that is detachably mounted on the stationary mount, wherein the order at which the detached counter-unit, the detached feed unit, and the detached cutting edge are mountable on the stationary mount is predefined.

12. The apparatus in accordance with claim 11, wherein a clamping device is provided to securely fix at least one first element of the counter-unit, feed unit and cutting edge onto the stationary mount in a final operation position, wherein the clamping device comprises at least one clamping pin that is movable between a retracted position and an extended position, wherein the at least one first element comprises at least one receiver into which the at least one clamping pin penetrates in the extended position, wherein the at least one first element is fixed onto the stationary mount in the final operation position by the at least one clamping pin when the at least one clamping pin is in the extended position, and wherein the at least one first element is detachable from the stationary mount when the at least one clamping pin is in the retracted position.

13. The apparatus in accordance with claim 12, wherein the at least one clamping pin is movable into an overextended position when the at least one element is detached from the stationary mount, wherein the control device is configured to recognize the overextended position.

14. The apparatus in accordance with claim 12, wherein the internal or external control device is configured to control the clamping device, wherein the control device is configured to move the at least one clamping pin between the retracted position and the extended position and determine a current position of the clamping pin, wherein the recognition of the extended position is associated to a correct positioning of the at least one first element in the final working position.

15. The apparatus in accordance with claim 12, wherein the clamping pin in the extended position fixes at least one second element of counter-unit, feed unit and cutting edge onto the stationary mount in a final operation position that is not identical to the at least one first element, and/or wherein the penetration of the at least one clamping pin into the receiver of the at least one first element induces a movement of the at least one second element that brings the at least one second element into its final operation position.

16. The apparatus in accordance with claim 1, wherein the output device is configured to eject material webs on multiple tracks and a feed gap is formed for each track by a driven feed roll and a pressing unit, and wherein the respective feed roll of the one pair and the pressing unit of a directly adjacent pair are together rotatably drivable about a common axis as a two-track unit, wherein the pressing units support a pressing sleeve that is freely rotatable about the common axis and disconnected from the driven rotation of the two-track unit.

17. The apparatus in accordance with claim 16, wherein a plurality of two-track units is provided next to one another and the respective pressing unit of the one two-track unit and the feed roll of a directly adjacent two-track unit are supported at one another at least in the radial direction and are rotatable with respect to one another.

18. An apparatus for a single-track or multitrack slicing of food products which supplies products to be sliced on one track or on multiple tracks to a cutting region in which a cutting blade moves in a rotating and/or revolving manner to cut the supplied products into slices; and having an apparatus for a single-track or multitrack provision of web-like interleaved sheet material at a cutting region in which products supplied on one track or on multiple tracks are cut into slices and interleaved sheets are introduced which are cut off from the provided interleaved sheet material in the cutting region, the apparatus comprising an output device which is configured to eject at least one material web into an ejection region, the output device comprising at least one driven feed roll and at least one counter-unit which defines a feed gap with the at least one driven feed roll for the material web, the output device configured to generate a compressed air flow to influence the ejected material web and comprising at least one outlet opening for the compressed air flow to pass out, the at least one outlet opening connected to a compressed air source via a supply line, the supply line provided with a controllable valve, wherein an internal or external control device is provided to control the controllable valve, wherein the strength of the air flow released through the at least one opening is variable in time by controlling the controllable valve accordingly.

19. The apparatus in accordance with claim 18, wherein the internal or external control device is configured to coordinate the slicing of the products and the provision of the interleaved sheet material.

* * * * *